(No Model.)
J. H. NORRELL.
SCISSORS ATTACHMENT.
No. 410,375. Patented Sept. 3, 1889.
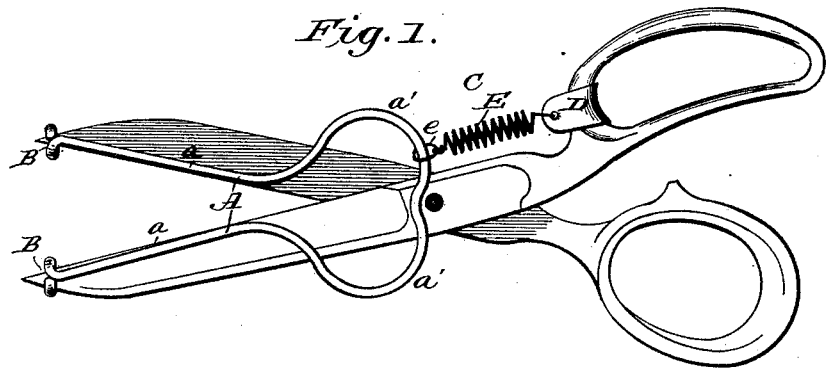
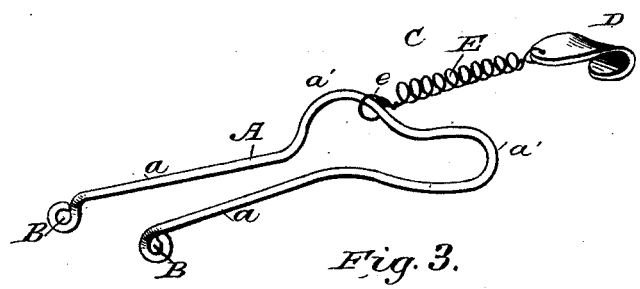
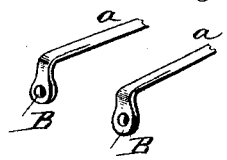
WITNESSES:
Fred G. Dieterich
P. B. Turpie.
INVENTOR
James H. Norrell
BY Munn & Co.
ATTORNEY

UNITED STATES PATENT OFFICE.

JAMES HOWARD NORRELL, OF AUGUSTA, GEORGIA.

SCISSORS ATTACHMENT.

SPECIFICATION forming part of Letters Patent No. 410,375, dated September 3, 1889.

Application filed May 22, 1889. Serial No. 311,738. (No model.)

*To all whom it may concern:*

Be it known that I, JAMES HOWARD NORRELL, of Augusta, in the county of Richmond and State of Georgia, have invented a new and useful Improvement in Scissors Attachments, of which the following is a specification.

My invention is an improvement in attachments for scissors by which to grip and hold fruit, flowers, and the like cut by the scissors and hold such objects until the scissors are opened.

The present invention consists in the novel constructions and combinations of parts, as will be described and claimed.

In the drawings, Figure 1 is a side view of a pair of scissors with my attachment in place. Fig. 2 is a detail view of the attachment, and Fig. 3 illustrates a somewhat different manner of forming the openings for the points of the scissors.

My invention comprises a spring-bow A, formed with arms $a$, provided at or near their free ends with openings B to receive the points of the scissor-blades, such openings being formed laterally to the arms $a$, so the latter may rest alongside the blades of the scissors. It will be seen that the arms $a$, when the attachment is applied to a pair of scissors, will be closed and opened as the scissor-blades are closed and opened. Consequently as the scissors are closed to cut the stem of the fruit or flower the arms $a$ will be closed against such stem below the scissors and will grasp and hold the stem of the cut flower or fruit until the scissors are opened.

The formation of the openings B for the scissor-points may preferably be effected by bending the points of the arms $a$ to form lateral eyes, as shown in Fig. 2. This is the preferred construction when round or flat wire is used in making the spring-bow. When a flat metal bar is used in making such bow, its ends may be bent at right angles and punched or drilled to form the openings, as will be understood from Fig. 3.

It will be seen that the bow is conveniently applicable to any ordinary pair of scissors without any change whatever in the construction of such scissors.

To secure the bow in place on the scissors, I provide a fastening C by which to hold it with its openings B on the scissor-points. This fastening may be simply a string or cord connecting the rear end of the bow with one of the handle-rings of the scissors; but it preferably consists of a hook D to engage the handle-ring and a spring E, forming a connection between said hook and the rear end of the spring-bow, such spring having preferably a ring or eye $e$ sliding on the rear portion of the bow. This rear portion of the bow is also preferably formed with seat-like portions $a'$ for the eye $e$, so that when the hook is engaged with one or the other handle-ring of the scissors the eye $e$ will be in one or the other of such bearing portions $a'$ and will be held from movement along the bow.

Having thus described my invention, what I claim as new is—

1. An attachment for scissors, comprising a bow the arms of which are adapted to extend in use alongside the scissor-blades, and having the free ends of its arms provided with openings adapted to receive the points of the scissor-blades, substantially as set forth.

2. The combination, with scissors, of the bow which is arranged alongside the same and has its free ends provided with openings to receive the points of the scissor-blade, and whose rear portion is provided with seats $a'$ $a'$, a hook for attachment to the ring of the scissor-handle, and a connection between said hook and bow, such connection engaging one of the seats $a'$ $a'$, substantially as shown and described.

3. The herein-described attachment for scissors, which is adapted for use alongside the latter, and consists of the bow A, the arms of which extend alongside of and close to the edges of the blades, and a fastening for securing it to the handle-ring of the scissors, substantially as shown and described.

4. The attachment for scissors, consisting of the following parts: the bow adapted to be used alongside the scissors, as described, a hook for engaging the handle-ring of the scissors, and a spring forming an elastic connection between said bow and hook, as specified.

5. The combination, with scissors, of the bow which is arranged alongside thereof, with its arms extended close to the edges of the blades, and has the free ends of its arms provided with openings and its rear portion provided with seats $a'\ a'$, the hook for engaging the handle-ring of the scissors, and the spring connecting said hook and bow, substantially as shown and described.

JAMES HOWARD NORRELL.

Witnesses:
J. M. CROWLEY,
A. POTTER.